United States Patent [19]  
Jurewicz et al.

[11] 3,905,914  
[45] Sept. 16, 1975

[54] V-P-ZR CATALYSTS AND METHOD OF PREPARATION THEREOF

[76] Inventors: Anthony T. Jurewicz, 9 Bedford Rd.; Lewis Brewster Young, 59 Stockton Rd., both of Kendall Park, N.J. 08824; Chin-Chiun Chu, 112 Wells Dr., South Plainfield, N.J. 07080

[22] Filed: July 16, 1973

[21] Appl. No.: 379,538

[52] U.S. Cl. .............. 252/437; 252/435; 260/346.8
[51] Int. Cl. ............................................. B01j 11/82
[58] Field of Search........ 252/428, 429 R, 435, 437; 260/346.8 A

[56] References Cited
UNITED STATES PATENTS
3,156,705  11/1964  Kerr............................ 260/346.8 A Primary Examiner—Henry R. Jiles
Assistant Examiner—Bernard I. Dentz

[57] ABSTRACT

V-P-Zr catalysts effective for the oxidation of alkanes to dicarboxylic acid anhydrides (e.g., maleic anhydride) are prepared by mixing vanadium pentoxide and a zirconium salt with a hydrogen halide, then adding phosphoric acid.

8 Claims, No Drawings

V-P-ZR CATALYSTS AND METHOD OF PREPARATION THEREOF

RELATED APPLICATIONS

This application is related to copending application Ser. No. 261,030, filed June 8, 1972, now abandoned which describes catalysts comprising complex reaction products of a vanadium oxy salt and phosphoric acid promoted with certain metals.

FIELD OF THE INVENTION

This invention has to do with a method for preparing vanadium - phosphorus - zirconium catalysts effective for the oxidation of alkanes to dicarboxylic acid anhydrides, particularly butane to maleic anhydride.

BACKGROUND OF THE INVENTION

Vanadium - phosphorus complex catalysts for the oxidation of butane to maleic anhydride, are described in U.S. Pat. No. 3,293,268. Such catalysts operate at temperatures greater than 500°C. In general, yields of maleic anhydride with such catalysts are relatively low and not commercially attractive or feasible.

More recently, catalysts comprising antimony, molybdenum and iron or vanadium, have been described for oxidizing $C_4$ and $C_5$ paraffin hydrocarbons to maleic anhydride. The catalysts are indicated to be useful at 300°–600°C.

Metal-promoted vanadium - phosphorus complex catalysts are described in U.S. Pat. No. 3,156,705. The metal promoters, identified as phosphorus stabilizers, are transition metals and rare earth metals. The catalysts are used for oxidizing an olefin (butene) to a dicarboxylic acid anhydride (maleic anhydride).

In application Ser. No. 261,030, filed June 8, 1972, there is described an improved process for oxidizing an alkane to a dicarboxylic acid anhydride in the presence of a catalyst comprising a complex reaction product of a vanadium oxysalt and phosphoric acid promoted with one or more of Cr, Fe, Hf, Zr, La and Ce. The atomic ratio of P/V is between about 0.5 and about 2, and the atomic ratio of promoter metal/V is between about 0.0025 and about 1, in such catalysts.

As an improvement over, and an extension of, the catalysts described in said application Ser. No. 261,030, the present invention is concerned with a particular method for making V/P/Zr catalysts and with the particular catalysts obtained with that method.

SUMMARY OF THE INVENTION

In accordance with the present invention, there is provided a method for preparing vanadium — phosphorus — zirconium composites which are catalytically active for the oxidation of an alkane to a dicarboxylic acid anhydride. The method comprises forming a mixture of a vanadium compound, a zirconium salt and a hydrogen halide, then adding phosphoric acid or a compound which hydrolyzes to phosphoric acid to the resulting solution to form a gel, and drying the gel.

The invention is also concerned with a process for oxidizing an alkane to a dicarboxylic acid anhydride by contacting the alkane with a molecular oxygen-containing gas under specified conditions in the presence of said composites.

SPECIFIC EMBODIMENTS OF THE INVENTION

The catalysts of this invention are prepared by forming a mixture of a vanadium compound, a zirconium salt (e.g., $ZrOCl_2$) and a hydrogen halide and heating the resulting solution to a temperature between about 50°C., and about 125°C. for a sufficient time to convert the resulting orange slurry to a blue solution ($V^{+5}$ to as low as $V^{+4}$). In forming this mixture the vanadium compound, zirconium salt and hydrogen halide can be added simultaneously, or in any sequence. Conveniently, the resulting solution can be refluxed at 100°–120°C. for between about 0.5 to about 5 hours to accomplish the desired reduction.

Vanadium compounds employed herein include $V_2O_5$, $VOCl_3$, $VO(NO_3)_3$, $NH_4VO_3$, and $VF_5$, of which $V_2O_5$ is particularly preferred. The zirconium salts are illustrated by $ZrOCl_2.4H_2O$, $ZrOCl_2.8H_2O$, $ZrO(OAc)_2.H_2O$, $ZrCl_4$, $Zr(OAc)_4$, $Na_2ZrCl_6$ and $ZrOBr_2.XH_2O$. The hydrogen halides used herein are HCl, HBr and HI, of which HCl is preferred.

The quantity of hydrogen halide is at least about 5 moles per gram atom of vanadium compound. Substantially larger quantities of hydrogen halide can be used; however, no advantages are realized with such larger amounts.

The quantity of zirconium salt employed is from about 0.0025 to about 0.5 gram atom per gram atom of vanadium compound. Thus, the quantities of vanadium compound and zirconium salt are such that the atomic ratio of Zr/V of the final composite is between about 0.0025 and about 0.5.

Thereafter, phosphoric acid or a phosphorus compound hydrolyzable to phosphoric acid ($P_2O_5$, $POCl_3$) is added to the blue-green solution and a gel is formed. The concentration of phosphoric acid can be from about 25% to 100%. The quantity of said phosphorus compound so added is from about 0.5 to about 2 gram atoms per gram atom of vanadium compound, such that the desired composite has an atomic ratio of P/V of between about 0.5 and about 2. The solution formed with the addition of phosphoric acid is refluxed, at about 100°–120°C. for 0.1–10 hours, to form a gel. Then, the gel is concentrated and evaporated to substantially dry condition in trays or by spray drying. The dried material is ground to about 20–60 mesh (U.S. sieve size). The ground material can be pelletized, for example, to ⅛ inch × 5/32 inch cylindrical pellets. Optionally, a binder such as stearic acid, can be added before pelletizing. Alternatively, the catalyst solution before drying can be used to impregnate a suitable carrier, such as alumina, alundum, silica, silicon carbide, silica-alumina, zirconia, zirconium phosphate, and/or a zeolite, to produce a supported catalyst suitable for use in a fixed or fluidized bed reactor. As a further alternative, the dried, unsupported catalyst can be ground to produce a powdered catalyst for use in a fluidized bed reactor.

The catalyst can be conditioned in the reactor by passing a hydrocarbon-air mixture through the catalyst bed as at about 450°C., prior to running the oxidation reaction. Such conditioning is, however, not necessary to obtain catalyst efficiency. In practice, anhydride product can be obtained upon commencing the flow of oxidation feed through the reactor.

The oxidation of n-butane (or other alkane) to maleic anhydride (or other anhydride) is carried out using air or other molecular oxygen-containing gases, such as mixtures of carbon dioxide and oxygen or mixtures of nitrogen or steam with air or oxygen. Air is preferred.

The oxidation reaction is carried out at temperatures of 300°–600°C., preferably 350°–550°C. The feed concentration is 0.5–6 volume percent butane in the oxygen-containing gas and preferably 1–5 volume percent. The contact time is generally varied between about 0.08–3 seconds, preferably about 0.16–1.6 seconds for fixed bed operation. Generally, contact times of up to about 30 seconds can be used in the case of fluidized bed operation. Thus contact time, depending upon the type of operation, will be about 0.08–30 seconds. Although the reaction can be carried out at 0.5–20 atmospheres pressure (absolute), it is preferably carried out at about 1–5 atmospheres.

The reaction can be carried out in any suitable reactor for effecting vapor phase oxidation reactions. For example, a fixed catalyst bed can be employed. The reaction can be carried out, however, by using smaller catalyst particles in a fluidized reactor bed.

In the examples and tables, percent yield of "MA" indicates maleic anhydride yield expressed as moles of desired product based upon moles of butane feed and was determined by titration.

Conversion of butane is represented by moles of butane reacted/moles of butane feed × 100.

Similarly, selectivity is represented by moles of maleic anhydride product/moles of butane reacted × 100.

Contact time is determined by quiescent catalyst bed volume/volumetric flow rate at reactor temperature and pressure.

The flow rates of air and butane were measured at room temperature and pressure.

The invention is shown by the following illustrative examples, contrasted with comparative examples.

EXAMPLE I - COMPARATIVE

A vanadium-phosphorus catalyst having a P/V ratio of 1.2/1 (atomic ratio) was prepared as follows: 129g of $V_2O_5$ was added to one liter of concentrated (37% by weight) HCl. The mixture was refluxed for two hours during which time the solution changed color from brown to dark blue. After two hours, 196g of 85% phosphoric acid was added and the resulting solution was refluxed for three more hours and put into an oven at 130°C. to dry. The resulting solid was ground to 60–200 mesh.

The catalyst (100 ml) was charged to a fluid bed reactor and 40 ml/min of n-butane and 1000 ml/min of air (room temperature flows) were passed through the catalyst. The reactor was heated at 450°C. for about sixteen hours.

A mixture of 20 ml/min n-butane and 500 ml/min air was passed through the catalyst at 460°C. Maleic anhydride product was determined by scrubbing the exit gases through water, followed by titration of an aliquot of the aqueous solution. In a one-hour sampling period, a 30% MA yield was obtained at 56% n-butane conversion.

EXAMPLE II

A catalyst having a P/V/Zr ratio (atomic) of 1.2/1/0.13 was prepared as follows: 129g of $V_2O_5$ and 46g of $ZrOCl_2 \cdot 4H_2O$ were added to 1 liter of concentrated (37% wt.) HCl. The resulting mixture was refluxed for 2 hours during which time the $V_2O_5$ dissolved and the color of the solution changed from brown to blue-green. To the latter solution was added 196g of 85% $H_3PO_4$, and the solution was refluxed for another three hours. Gel formation occurred during this time. The mixture was put into an oven to dry at 130°C. The resulting solid was ground to 60–200 mesh.

The unused catalyst prepared as described had x-ray powder diffraction lines with d-spacings (intensities greater than 5% of most intense) of 5.683A(100), 4.518A(46), 4.102A(7), 3.672A(29), 3.290A(32), 3.108A(17), 2.936A(45), 2.791A(9), 2.656A(15), 2.611A(9). The catalyst after use had x-ray powder diffraction lines characteristic of $Zr_2P_2O_7$ and a V-P-O compound with d-spacings (intensities greater than 5% of most intense) of 6.276A(10), 4.797A(9), 3.864A(100), 3.134A(62), 2.982A(32), 2.656A(8), 2.437A(14), 2.091A(16).

The catalyst (100 ml) was charged to a fluid bed reactor at room temperature (about 20°C.) and 40 ml/min of n-butane and 1000 ml/min of air were passed through the catalyst. The reactor was heated at 450°C. for about sixteen hours.

A mixture of 20 ml/min of n-butane and 500 ml/min of air was passed through the catalyst at 400°C. Maleic anhydride was determined by scrubbing the exit gases through water, followed by titration of an aliquot of the aqueous solution. In a one-hour sampling period, 49% MA yield was obtained at 80% n-butane conversion.

EXAMPLE III

A series of catalysts having different P/V/Zr ratios was prepared according to the procedure given in EXAMPLE II. These catalysts were charged to a fluid bed reactor and 40 ml/min of n-butane and 1000 ml/min of air were passed through the catalyst. The reactor was heated at 450°C. for sixteen hours.

A mixture of n-butane and air (butane/air = .04) was passed through the catalysts at 450°C. and the yields of maleic anhydride were determined as in the previous examples. These results are given in TABLE I.

TABLE I

| Atomic Ratio P/V/Zr | Contact Time (sec) | MA Yield % | n-Butane Conversion % |
|---|---|---|---|
| 1.2/1/0.06 | 2.0 | 29 | 52 |
| 1.2/1/0.10 | 2.6 | 40 | 70 |
| 1.2/1/0.26 | 2.4 | 22 | 82 |

EXAMPLE IV

A series of catalysts having a P/V/Zr ratio (atomic) of 1.2/1/0.13 was prepared according to the procedure and quantities set forth in EXAMPLE II, except for the amount of concentrated (37% wt.) HCl used in the catalyst preparation.

These catalysts were charged to a fluid bed reactor and 40 ml/min of n-butane and 1000 ml/min of air were passed through the catalysts. The reactor was heated at 450°C. for sixteen hours.

A mixture of 30 ml/min n-butane and 750 ml/min air was passed through the catalyst at 425°C. Maleic anhydride yields were determined according to the procedure in EXAMPLE II.

The catalyst prepared using 750 ml of concentrated HCl gave a 38% maleic anhydride yield at 68% butane conversion, while that prepared using 500 ml of concentrated HCl gave a 28% maleic anhydride yield at 60% conversion.

EXAMPLE V

A catalyst having a P/V/Zr ratio (atomic) of 1.2/1/0.13 was prepared as follows: 129g of $V_2O_5$ and 44g of $ZrO(OAc)_2 \cdot H_2O$ were added to 1 liter of concentrated HCl. The resulting mixture was refluxed for 2 hours during which time the $V_2O_5$ dissolved and the color of the solution changed from brown to blue-green. To this solution was added 196g of 85% $H_3PO_4$, and the solution was refluxed for another three hours and gel formation occurred. The mixture was then put into an oven to dry at 130°C. The resulting solid was ground to 60–200 mesh.

The catalyst (100 ml) was charged to a fluid bed reactor at room temperature (about 20°C.) and 40 ml/min of n-butane and 1000 ml/min of air were passed through the catalyst. The reactor was heated at 450°C. for sixteen hours.

A mixture of 30 ml/min of n-butane and 750 ml/min of air was passed through the catalyst at 425°C. The yield of maleic anhydride, 42% at 77% butane conversion, was determined according to the procedure in EXAMPLE II.

EXAMPLE VI - COMPARATIVE

A catalyst having a P/V/Zr ratio (atomic) of 1.2/1/0.13 was prepared as follows: 129g of $V_2O_5$ was added to 1 liter of concentrated HCl. The resulting mixture was refluxed for 1 hour during which time the $V_2O_5$ dissolved and the color of the solution changed from brown to blue. To this solution was added 196g of 85% $H_3PO_4$, and the solution was refluxed for an additional three hours. To this solution was added 46g of $ZrOCl_2 \cdot 4H_2O$ and the solution was refluxed for another hour. No gel formation was observed. The solution was put into an oven to dry at 130°C. The resulting solid was ground to 60–200 mesh.

The catalyst (100 ml) was charged to a fluid bed reactor at room temperature (about 20°C.) and 40 ml/min of n-butane and 1000 ml/min of air were passed through the catalyst. The reactor was heated at 450°C. for sixteen hours.

The yield of maleic anhydride was determined according to the procedure in EXAMPLE II. A mixture of 20 ml/min of n-butane and 500 ml/min of air was passed through the catalyst at 400°C. A 20% yield of maleic anhydride was obtained at 52% butane conversion.

EXAMPLE VII - COMPARATIVE

A catalyst having a P/V/Zr ratio (atomic) of 1.2/1/0.13 was prepared as follows: 129g of $V_2O_5$, 196g of 85% $H_3PO_4$ and 46g of $ZrOCl_2 \cdot 4H_2O$ were added simultaneously to 1 liter of concentrated HCl. The resulting mixture was refluxed for 5 hours during which time the $V_2O_5$ dissolved and the color changed from brown to dark green. No gel formation was observed. The solution was put into an oven to dry at 130°C. The resulting solid was ground to 60–200 mesh.

The catalyst (100 ml) was charged to a fluid bed reactor at room temperature and 40 ml/min of n-butane and 1000 ml/min of air were passed through the catalyst. The reactor was heated at 450°C. for sixteen hours.

The yield of maleic anhydride was determined according to the procedure in EXAMPLE II. A mixture of 20 ml/min of n-butane and 500 ml/min of air was passed through the catalyst at 400°C. A 19% yield of maleic anhydride was obtained at 63% butane conversion.

The effect of reagent addition order in the catalyst preparation is clearly demonstrated by the data obtained using the catalysts of EXAMPLES II, VI, VII, and is given in the following TABLE. The data show that the preferred sequence of addition is formation of a mixture of HCL and the vanadium and zirconium compounds followed by addition of the phosphorus compound.

TABLE II

| Reagent Addition Order | | | Example No. | Contact time (sec) | % Maleic Anhydride Yield | % Butane Conversion |
| --- | --- | --- | --- | --- | --- | --- |
| 1st | 2nd | 3rd | | | | |
| V,Zr | P | — | II | 5.1 | 49 | 80 |
| V | P | Zr | VI | 5.1 | 20 | 52 |
| V,P,Zr | — | — | VII | 5.1 | 19 | 63 |
| V,Zr | P | — | II | 3.4 | 40 | 69 |
| V | P | Zr | VI | 3.4 | 21 | 48 |
| V,P,Zr | — | — | VII | 3.4 | 22 | 55 |

Temperature = 400°C. in all Examples.

EXAMPLE VIII

A catalyst similar to that described in EXAMPLE IV was prepared by following the procedure described in said EXAMPLE. However, the quantities of reactants were:

| | |
| --- | --- |
| $V_2O_5$ | 516 grams |
| $ZrOCl_2 \cdot 4H_2O$ | 184 grams |
| HCl(37% wt.) | 4 liters |
| $H_3PO_4$(85%) | 794 grams. |

The catalyst (500 ml.) was charged to a fluid bed reactor at room temperature (about 20°C.) and 40 ml/min of n-butane and 1000 ml/min of air were passed through the catalyst. The reactor was heated at 450°C. for about 16 hours.

A mixture of 30 ml/min of n-butane and 750 ml/min of air was passed through the catalyst at 375°C. The contact time was approximately 18 seconds. In a one-hour sampling period, 54% MA yield was obtained at a 93% n-butane conversion. A corresponding run at 350°C. and a contact time of 27 seconds, resulted in a 50% MA yield at a 86% n-butane conversion.

EXAMPLE IX

A catalyst was prepared by adding $V_2O_5$ to HCl and the resulting solution was refluxed until the solution turned blue, followed by addition of $ZrOCl_2 \cdot 4H_2O$ and refluxing for an additional 30 minutes, and finally addition of $H_3PO_4$. The quantities of reactants are the same as described in

EXAMPLE I.

The resulting catalyst (V/P/Zr = 1/1.2/0.13) was charged to a reactor as described in EXAMPLE I. With a charge of 40 ml/min of n-butane and 1000 ml/min of air, there was obtained a 40% yield of MA at 65% n-butane conversion.

Although the present invention has been described with preferred embodiments, it is to be understood that modifications and variations may be resorted to, without departing from the spirit and scope of this invention, as those skilled in the art will readily understand.

What is claimed is:

1. A method for preparing a vanadium-phosphorus-zirconium composite, having an atomic ratio of P/V of between about 0.5 and about 2 and an atomic ratio of Zr/V of between about 0.0025 and about 0.5, which comprises:
   a. forming a mixture of (i) a vanadium compound selected from the group consisting of $V_2O_5$, $VOCl_3$, $VO(NO_3)_3$, $NH_4VO_3$ and $VF5_3$, (ii) a zirconium salt selected from the group consisting of $ZrOCl_2$, $ZrOCl_2 \cdot 4H_0$, $ZrOCl_2 \cdot 8H_2O$, $ZrO(OAc)_2 \cdot H_2O$, $ZrCl_4$, $Zr(OAc)_4$, $Na_2ZrCl_6$ and $ZrOBr_2 \cdot xH_2O$, and (iii) aqueous HCl, HBr or HI;
   b. heating the resulting solution at a temperature between about 50°C. and about 125°C. for a sufficient time to convert the resulting orange slurry to a blue solution, the quantity of the hydrogen halide (iii) being at least about 5 moles per gram atom of said vanadium compound (i) and the amount of said zirconium salt (ii) being from about 0.0025 to about 0.5 gram atom per gram atom of vanadium compound (i);
   c. adding from about 0.5 to about 2 gram atoms of phosphoric acid or of a compound hydrolyzable to phosphoric acid per gram atom of said vanadium compound, to the resulting solution to form a gel; and
   d. drying the gel.

2. The method of claim 1, wherein the zirconium salt is zirconyl chloride.

3. The method of claim 1, wherein the vanadium compound (i) is $V_2O_5$.

4. The method of claim 1, wherein the zirconium salt is zirconyl acetate.

5. The method of claim 1, wherein the atomic ratio of Zr/V is between about 0.0075 and about 0.2.

6. The method of claim 1, wherein the hydrogen halide is aqueous hydrogen chloride.

7. The method of claim 1, wherein the dried gel is ground to finely divided particles.

8. A vanadium - phosphorus - zirconium composite catalytically active for the oxidation of paraffins and having an atomic ratio of P/V of between about 0.5 and about 2 and an atomic ratio of Zr/V of between about 0.0025 and about 0.5, prepared by the method of Claim 1.

* * * * *

UNITED STATES PATENT AND TRADEMARK OFFICE
CERTIFICATE OF CORRECTION

PATENT NO. : 3,905,914
DATED : September 16, 1975
INVENTOR(S) : ANTHONY T. JUREWICZ, LEWIS B. YOUNG and CHIN-CHIUN CHU It is certified that error appears in the above-identified patent and that said Letters Patent are hereby corrected as shown below:

| | |
|---|---|
| Title Page | --[73] Assignee: Mobil Oil Corporation New York, N. Y. -- and --Attorney, Agent, or Firm: Charles A. Huggett; Hastings S. Trigg-- should be inserted. |
| Col. 2, line 13 | "$VF5_3$, of" should be --$VF_5$, of -- |
| Col. 7, line 11 | "and $VF5_3$ (ii)" should be --$VF_5$ (ii)-- |
| Col. 7, line 13 | "$ZrOCl_2 \cdot 4H_o$" should be --$ZrOCl_2 \cdot 4H_2O$-- |
| Col. 7, line 13 | "$zroc_{l2}.$" should be --$ZrOCl_2 \cdot$-- |

Signed and Sealed this seventeenth Day of February 1976

[SEAL]

Attest:

RUTH C. MASON
Attesting Officer

C. MARSHALL DANN
Commissioner of Patents and Trademarks